(12) United States Patent
de Rox

(10) Patent No.: US 12,015,865 B2
(45) Date of Patent: Jun. 18, 2024

(54) SYSTEM AND METHODS FOR EVOKING AUTHENTIC EMOTIONS FROM LIVE PHOTOGRAPHIC AND VIDEO SUBJECTS

(71) Applicant: Jeshurun de Rox, Beaverton, OR (US)

(72) Inventor: Jeshurun de Rox, Beaverton, OR (US)

( * ) Notice: Subject to any disclaimer, the term of this patent is extended or adjusted under 35 U.S.C. 154(b) by 105 days.

(21) Appl. No.: 17/832,624

(22) Filed: Jun. 4, 2022

(65) Prior Publication Data

US 2023/0396729 A1 Dec. 7, 2023

(51) Int. Cl.
*H04N 5/222* (2006.01)
*G06V 10/764* (2022.01)
*G10L 15/22* (2006.01)
*G10L 15/26* (2006.01)
*H04N 23/60* (2023.01)
*H04N 23/611* (2023.01)
*H04N 23/62* (2023.01)

(52) U.S. Cl.
CPC ......... *H04N 5/2222* (2013.01); *G06V 10/764* (2022.01); *H04N 23/611* (2023.01); *H04N 23/62* (2023.01); *H04N 23/64* (2023.01); *G06V 2201/10* (2022.01); *G10L 15/22* (2013.01); *G10L 2015/223* (2013.01); *G10L 15/26* (2013.01)

(58) Field of Classification Search
CPC .... H04N 5/2222; H04N 23/611; H04N 23/62; H04N 23/64; H04N 23/61; H04N 23/63; H04N 23/633; H04N 23/634; G06V 10/764; G06V 2201/10; G10L 15/22; G10L 15/26; G10L 2015/223

USPC .......... 348/333.01, 333.02, 333.04
See application file for complete search history.

(56) References Cited

U.S. PATENT DOCUMENTS

| | | | |
|---|---|---|---|
| 9,204,098 B1* | 12/2015 | Cunico | G10L 25/63 |
| 2017/0105662 A1* | 4/2017 | Silawan | A61B 5/14542 |
| 2017/0319123 A1* | 11/2017 | Voss | A61B 5/681 |
| 2017/0374245 A1* | 12/2017 | Rolczynski | H04M 1/72427 |
| 2018/0234622 A1* | 8/2018 | Bostick | H04N 23/64 |
| 2019/0116323 A1* | 4/2019 | Kim | H04N 5/2621 |
| 2020/0005101 A1* | 1/2020 | Tsuji | G06F 18/28 |
| 2022/0247919 A1* | 8/2022 | O'Leary | H04N 5/2628 |
| 2023/0316950 A1* | 10/2023 | Thavarajah | G10L 15/187 |
| 2023/0319121 A1* | 10/2023 | Smith | G10L 15/26 |
| | | | 704/235 |

* cited by examiner

*Primary Examiner* — Albert H Cutler
(74) *Attorney, Agent, or Firm* — Metropolis IP Group, LLC; Eric Kang

(57) ABSTRACT

A system for a user taking photographs or videos to help evoke genuine emotions of one or a plurality of live camera subjects, comprising a digital device with a processor, a display, and system memory, a software application with a graphical user interface installed on the digital device or a remote server, wherein said application is used to store, manage, access, and view metadata tagged prompts, a preloaded library of metadata tagged prompts, wherein said prompts being emotive phrase(s), direction(s), image(s), sound(s), and/or animation(s), wherein said application has a two-stage filter to successively refine the list of prompts to be presented to the user, and a prompt delivery system to convey prompts to one or a plurality of live camera subjects.

18 Claims, 5 Drawing Sheets

CHOICE 2.
WHAT KIND OF FEELING DO YOU WANT TO EVOKE?

400

401 — LOL (light-hearted, innocent, playful, laughing, joyful feelings)

402 — WARM & FUZZY (affectionate, connective, caring, loving feelings)

403 — DEEP & MEANINGFUL (personal, intimate, introspective, profound feelings)

FIG. 4

SYSTEM AND METHODS FOR EVOKING AUTHENTIC EMOTIONS FROM LIVE PHOTOGRAPHIC AND VIDEO SUBJECTS

FIELD OF THE DISCLOSURE

The field of the disclosure is tools and more specifically, a system and methods for managing and presenting content to evoke authentic emotions from live photographic and video subjects.

BACKGROUND OF THE DISCLOSURE

One of the biggest issues burdening people taking photographs or videos ("Users") is the difficulty of creating and capturing ideal, authentic, genuine emotions, or a range of emotions in their pictures or videos of live subject(s). While experience may help Users remember certain prompts or guidance that more easily evoke genuine and authentic emotions, there is much room for improvement. For example, even with a comprehensive book of effective phrases, not all individuals react the same to a given phrase. Furthermore, the User may not readily recall or promptly search for the correct phrase to use for a given situation because of the extremely large combination of scenarios. The advent of the digital computer, computer operating systems, data storage and networking, various input/output (I/O) devices like touch screens and keyboards, and associated drivers have fostered the development of software applications that cater to a wide range of applications, but none remotely tied to evoking genuine and/or authentic emotions for photography or video in the manner disclosed for the present invention.

SUMMARY OF THE DISCLOSURE

The inventor of the present disclosure has recognized and observed the subtleties of interpersonal neurobiology and how it affects outcomes in photography and motion picture capture of live subject(s). After years of experimentation, the result has been reduced to practice and described in the present disclosure, which is drawn to a system and methods to effectively narrow down a list of "Prompt(s)" (defined as emotive phrase(s), direction(s), image(s), sound(s), and/or animation(s)) that help evoke genuine and authentic emotions from live photographic and video subjects. The system comprises an Application Host Device that runs an Application. Among the numerous features are a two-stage filter built into the Application that corresponds to the type of live camera subject(s) and the type of emotion or reaction to be evoked. In addition, a curated, pre-loaded and tagged library of Prompt(s) is included in the Application, resulting in a highly effective digital lookup table so that the Application User can quickly find the correct Prompt(s) to project to the live subject(s). The projection of the Prompt(s) is fulfilled with a Prompt Delivery System followed by a response from the live camera subject(s) and simultaneous capture of the image(s) or video. The combination of Application Host Device, Application, library of curated and tagged library of Prompt(s), two-stage filter, Prompt Delivery System, as well other supporting hardware and methods as disclosed elevates the effectiveness of evoking the proper emotions or reactions well above anything previously available regardless of the experience level of the person taking the photograph or video, much less aptitude with interpersonal neurobiology.

BRIEF DESCRIPTION OF THE DRAWINGS

The drawings are provided to facilitate understanding of the detailed description. It should be noted that the drawing figures may be in simplified form and should not be construed to limit the scope of the embodiment in any manner. Portions of certain figures are accompanied by icons depicting actions, processes, process states, individuals representing certain roles defined herein, and items. These icons are meant to efficiently convey information in an impactful and potentially more universal manner. Any ambiguity in an icon's meaning is clarified by content provided in the DETAILED DESCRIPTION OF THE DISCLOSURE and not be construed to limit the scope of the embodiment in any manner.

FIG. 4 is an embodiment of the set of different emotions the live camera subject(s) should naturally evoke that are recognized within the Application and acts as a second-stage filter to refine the presented Prompt set

DETAILED DESCRIPTION OF THE DISCLOSURE

Figure 1:
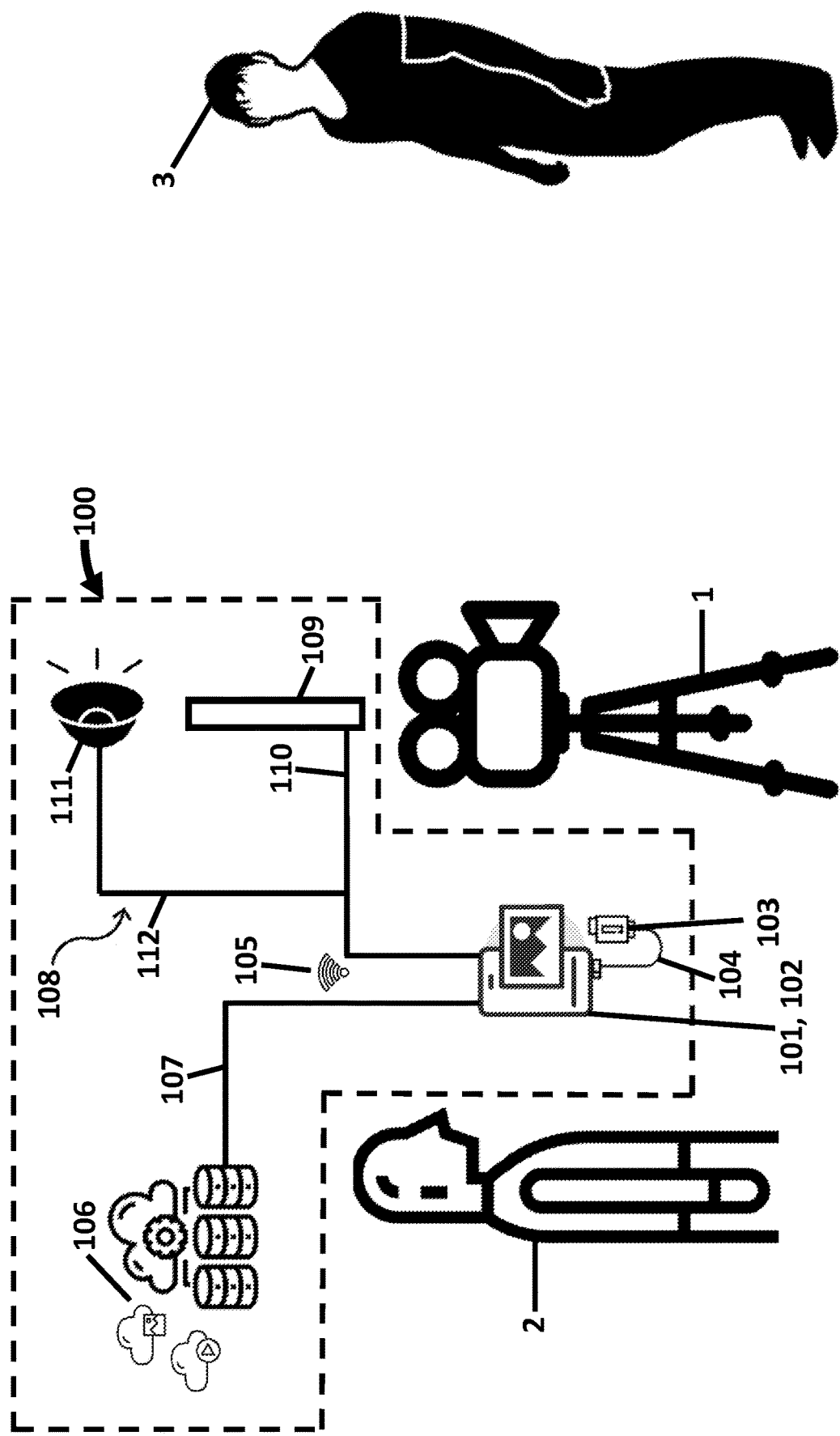
FIG. 1 schematically depicts the system (within the dashed area), the camera, the User, and a representation of live camera subject(s)

I) System (100)—Ref. FIG. 1

FIG. 1 depicts a schematic of the system (100) in relation to the camera (1), person taking the photograph or video or User (2), and live subject(s) (3). The camera (1) may be any photographic or video capturing device. Embodiments of the system (100) comprise those where the system is fully integrated within the camera (1), all attached to the camera (1), fully detached from the camera (1), or have some components integrated, and/or attached, and/or detached from the camera (1). The User (2) may be present at the site of the camera (1) and live subject(s) (3) or maybe at a different, remote location and maybe one or more live persons or an artificial intelligence-driven machine. The live subject(s) (3) comprise human or non-human animals.

Embodiments of the system (100) comprise the following components:

Application Host Device or AHD (101): The purpose of the AHD (101) is to support functions of the software Application (102). The AHD (101) has hardware and operating system software to allow the User to interact with the Application (102). The operating system may be or include a variety of operating systems such as the Android®, Macintosh® OS or iOS, Microsoft Windows®, Unix, Linux, Xenix, IBM AIX™, Hewlett Packard UX™, Novell Netware™, the Sun Microsystems 35 Solaris™, OS/2™, BeOS™, Apache™, OpenStep™, or another operating system or platform.

Exemplary AHD (101) devices can be a desktop personal computer (PC), laptop/notebook personal computer, portable mobile device (tablet, smartphone), or any hardware apparatus that includes a processor or plurality of processors, system memory (i.e., RAM/ROM/cache), large permanent local data storage where an operating system, hardware drivers, applications, and applications are stored, optional removable flash memory (e.g., regular/mini/micro-SD cards, thumb drives), optional disk drives, remote cloud storage directly linked to the AHD (101), built-in or connected external I/O devices (e.g., buttons, monitor, capacitive touchscreen, trackpad, speaker, jack(s)/port(s) to connect to external devices), network adaptor(s), hardware drivers to control external devices like speaker(s), display(s), monitor(s), camera(s), and a bus that couples various system components including the system memory to the processor(s). For embodiments requiring wireless connectivity, the AHD (101) also have radio hardware, circuitry, and drivers to enable such communications.

At a minimum, the memory includes at least one set of instructions that is either permanently or temporarily stored. The processor executes the instructions that are stored in order to process data. The set of instructions may include various instructions that perform a particular task or multiple tasks. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

1) Application (102): The purpose of the Application (102) is to enable the User to quickly find effective emotive phrase(s), direction(s), image(s), sound(s), and/or animation(s) collectively called "Prompt(s)," and project it via Prompt Delivery System ("PDS") that will be described later.

The Application (102) is software installed in the Application Host Device ("AHD") (101) or installed remotely on a remote server (107) and accessed through a web browser on the AHD (101). The remote installation embodiment of the Application (102) can operate under a subscription-based Software-as-a-Service (SaaS) licensing model. The Application (102) software employs a graphical user interface (GUI) that drives User interaction with the AHD (101) through several input/output (I/O) elements including but is not limited to: display including those that respond to touch (on a touchscreen), mouse, trackpad, keyboard (virtual or mechanical), built-in and/or plugged-in microphone, and built-in and/or plugged-in audio output devices. These and other input devices are often connected to the processing unit through a user input interface that is coupled to the system bus but may be connected by other interface and bus structures, such as a parallel port, game port, or a universal serial bus (USB).

Functional requests to the Application (102) are made with the guidance of a graphical user interface (GUI) on the AHD's display. The GUI comprises windows and panels (fixed or dock-able), menus, text fields, radiobuttons, checkboxes, buttons, and many other "widgets" that guide the User (i.e., aim a cursor or pointer) in interacting with the AHD's I/O hardware to execute the desired actions such as type, select, save, edit, view, play multimedia content, and more actions. Collectively, the GUI, as well as physical controls on the AHD and the rest of the system to control aspects of the Application make up the "Application Interface."

For Application (102) embodiments that allow control over the camera (1), the Application can send signals through a connection (not shown) to the camera (1) to execute actions on the camera such as shoot, shoot a quick succession of many shots (a.k.a. "Burst" shots), and start or pause or stop video recording. Further details of the Application (102) are provided in FIGS. 2-5 and the corresponding descriptions, most notably among them a two-stage filter to effectively refine the list of Prompt(s) and a curated, pre-loaded library of Prompt(s) that can be further edited by the User (2).

Any suitable programming language may be used in accordance with the various embodiments of the invention. Illustratively, the programming language used may include assembly language, Ada®, APL, Basic, C, C++, COBOL, dBase, Forth, FORTRAN, HTML5, Java®, Kotlin™, Modula-2, Pascal, Prolog®, Python®, REXX, Swift, and/or JavaScript®, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

2) Audio Interface with User: An embodiment of the present invention has a microphone (103) so that the User (2) can interact with said Application (102) using voice commands. Said microphone (103) may be integrated with the AHD (101) or be external to the AHD (101). If external, embodiments of the signal conduit between the external microphone (103) and AHD (101) may be wired where the wire (104) connects the AHD's microphone jack and microphone (103). Alternatively, if the external microphone (103) and AHD (101) have wireless connectivity of the same communications protocol, no wire (104) is needed.

When a User (2) issues voice commands or selections to the microphone (103), the voice is transmitted as signals (e.g., data waveforms) to a speech-to-text (STT) voice processing algorithm within the AHD's operating system's built-in software suite or module within the Application (102), wherein said STT voice processing algorithm parses and extracts the User's (2) spoken word(s) and/or phrase(s), the Application (102) attempts to match the extracted words to available choice(s) of type of live subject(s) (3), and if successful, selects the type of live camera subject(s) (3) for the User (2) to confirm.

An embodiment of the present invention has a speaker (not shown) or earphone (not shown) so that the User (2) can preview Prompt(s) or hear audible content from the Application (102). This speaker may be integrated with the AHD (101) or be external to the AHD (101). An external speaker or earphone may be connected to the AHD (101) by wire (not shown), where the wire connects the AHD's output jack and external speaker or earphone. Alternatively, the external speaker and AHD (101) can connect wirelessly if both support the same communications protocol. The Application (102) outputs audible content, verbal information, and Prompt(s) to this speaker or earphone during the stage when the User (2). For verbal information and/or prompts, the Application (2) uses a text-to-speech module, which is a well-known and established technology.

3) Local Area and Internet Network and Connectivity (105): The internet and data network, in one embodiment, may be implemented as a single network or a combination of multiple networks. Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. In another example, the network may comprise a wireless telecommunications network (e.g., cellular phone network) adapted to communicate with other communication networks, such as the internet.

Hence, embodiments of the present invention include the ability for the AHD (101) and Application (102) to send and access data locally (e.g., Local Area Network, LAN) as well as send/receive signals to peripheral devices using a wired or wireless (105) connection. An intermediary router (not shown) can be used to connect local system devices as well as to a modem (not shown) for internet access. Said router can be combined with a modem for internet access. Alternatively, the AHD (101) may directly access the internet with an appropriate built-in radio, circuitry, and supporting wireless telecommunications network.

Some suitable communications protocols may include TCP/IP, UDP, or OSI, for example. For wireless communications, communications protocols may include Bluetooth®, Zigbee®, IrDa, Wi-Fi®, 2G, 3G, Ultra-Wideband, and Long-Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Access to the internet enables a variety of Application (102) functions including Over-the-Air (OTA) software updates, features, content such as new/revised Prompts, remote storage of photos and video, SaaS services, social media management, customer account management, and more. Some of these features will be discussed later.

Although many other internal components of the computer are not shown, those of ordinary skill in the art will appreciate that such components and the interconnections are well known. Accordingly, additional details concerning the internal construction of the computer need not be disclosed in connection with the present invention.

4) System Storage and Database, Connectivity, and Related Hardware/Software (106-107): Aside from storage and database provisions built into the AHD (101), embodiments of the present invention include provisions of storage and database (106) within the LAN and/or remotely (e.g., cloud) where the connection is wired or wireless (107). Embodiments of networked storage/database can follow the server-client model, where the storage/database is the server (106) and the Application (102) is the client. The server-side hardware/software (106) may be described in the general context of computer system-executable instructions, such as program modules, being executed by a computer system. Generally, program modules may include routines, programs, objects, components, logic, data structures, and so on that perform tasks or implement abstract data types. The server functions may be practiced in distributed cloud computing environments where tasks are performed by remote processing devices that are linked through a communications network. In a distributed cloud computing environment, program modules may be in both local and remote computer system storage media including memory storage devices. The server hardware (106) may comprise at least one processor core or processing unit, a system memory (i.e., RAM/ROM/cache), storage, and a bus that couples various system components including the system memory to the processor(s). The server may include social media services operating on the internet, the Application (102) provider, Application's account services, and more.

To respond to client/Application (102) requests for data or requests to store data, the server may query its database (106) to retrieve or store various data, such as a customer's profile, User's profile, document, or multi-media content, and other content that will be described in the following sections. The database (106) may be a relational database responsive to Structured Query Language ("SQL") commands. The behavior adapter server may execute a hypertext preprocessor ("PHP") script including SQL commands to query the Database for various data.

5) Prompt Delivery System (108): The purpose of the Prompt Delivery System ("PDS") (108) is to convey User-approved/confirmed Prompts to the live camera subject(s) (3). The PDS (108) comprises a Prompt Screen (109) and a wired or wireless connection (110) between the AHD (101) and the Prompt Screen (109) that act as an information conduit of the signals containing the intended phase(s), and/or direction(s), and/or image(s), and/or animation(s) to be displayed on the Prompt Screen (109). A suitable type of Prompt Screen (109) can comprise any of the following: liquid crystal display (LCD), light-emitting diode (LED) display, cathode ray tube (CRT) display, and more. Embodiments of the Prompt Screen (109) may also be a screen that is able to receive and show content from a separate projector (not shown).

An alternative embodiment of the PDS optionally adds a powered speaker (111) that is connected to the AHD (101) by a wired or wireless connection (112) that acts as an information conduit of the signals containing the intended phase(s), and/or direction(s) to be spoken by said Application's (102) text-to-speech processor and heard by both the User (2) and live camera subject(s) (3). The speaker (111) can also project sounds including those corresponding to animation(s) shown on the Prompt Screen (109). Another alternative embodiment may have the speaker (111) and wired or wireless connection (112) replace the Prompt Screen (109) and wired or wireless connection (109).

The aforementioned wired connection embodiments (110, 112) can connect to the AHD (101) by jack port(s) integrated with the AHD (101). Alternative embodiments can have the AHD (101) be integrated with the Prompt Screen (109) and/or speaker (111). Such an embodiment would preferably have a second display/screen for the User (2) to see during operation.

Figure 2:
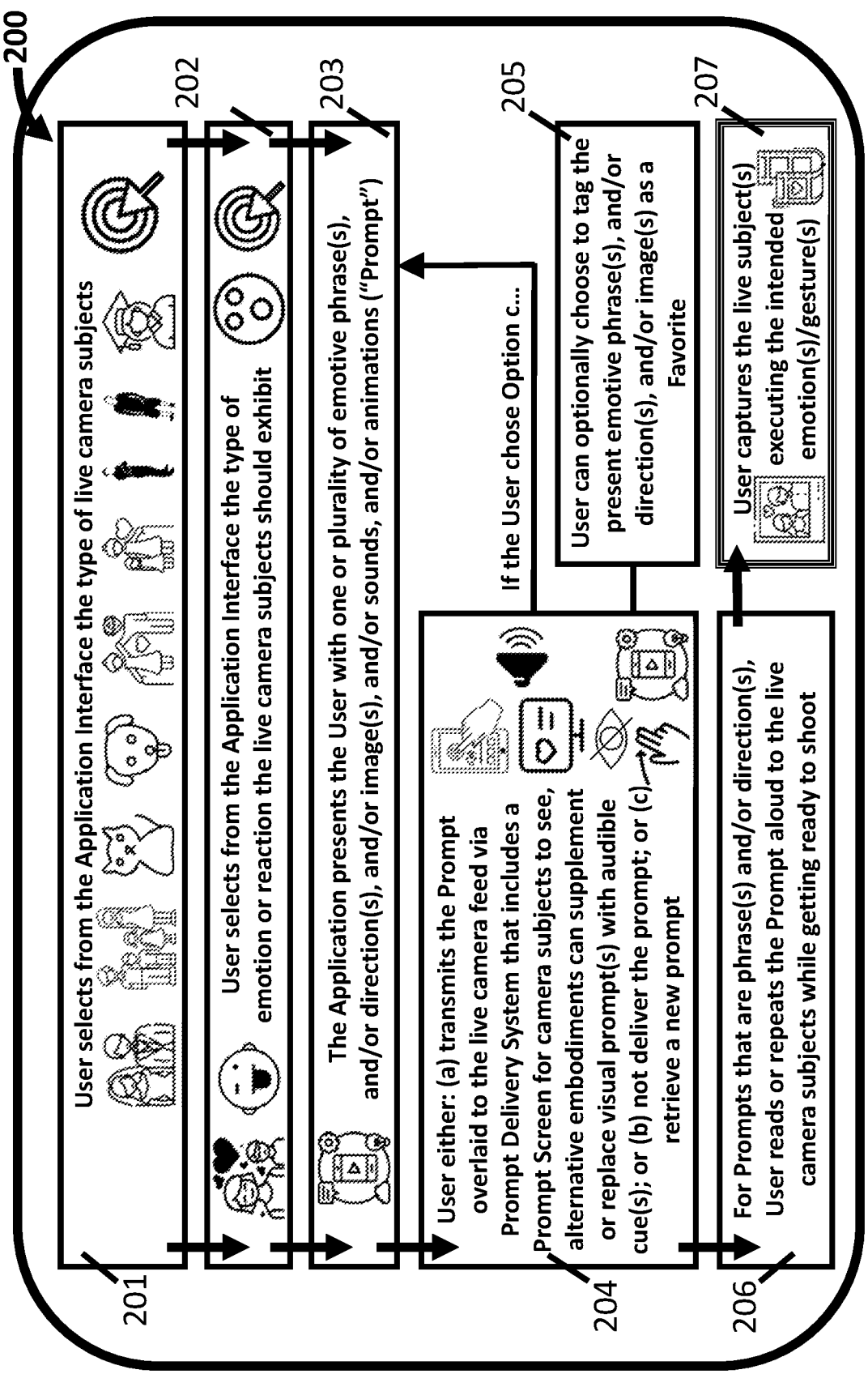
FIG. 2 shows an embodiment of a method of using the system and camera to evoke genuine and authentic emotions from live camera subject(s)

II) Method of Use (200)—Ref. FIG. 2

FIG. 2 depicts, in flowchart form, an embodiment of the overall method (200) for evoking genuine and authentic emotions from live photographic and video subject(s). Embodiments of the depicted method (200) and its alternative variants comprise the following steps:

1) Selecting the Type of Live Camera Subject(s) (201): The first step (201) in the overall method (200) is for the User (2) to select the type of live camera subject(s) (3). Live camera subject(s) (3) can be human(s) or animal(s) such as pet(s). Further details on the type of live subject(s) and how they are organized in the Application (102) are discussed later in Section III description of FIG. 3. The purpose of this step is to provide a first stage filter that the Application (102) uses to determine the suitable Prompts to be presented to the User (2). The Prompts come from a repository accessed either locally from the Application (102) or remotely from the Application (120) installed on a remote server (106). Each Prompt contains metadata tags that are used in this first-step filtering process. One selection method embodiment is where the User (2) engages widgets on the Application (102) GUI (e.g., windows and panels, menus, text fields, radiobuttons, checkboxes, buttons, etc.).

An alternative method of selection embodiment is where the User (2) speaks within audible range of the system's microphone (103) with certain recognizable words that indicate the type of live camera subject(s). If no match is found from the available choice(s), the User (3) is provided feedback and an opportunity to reselect by this or alternative means.

A third selection embodiment has the camera (1) capture the subject(s) (3) and that camera feed is sent to the Application (102) which then uses artificial intelligence (A.I.) based image recognition technology to identify the type of subject(s). An embodiment of this A.I.-driven technology comprises a database and a trained neural network or equivalent to help classify the type of subject(s). The method of training a neural network or alternative approaches for people and group recognition is well recognized in the A.I. community. An embodiment of the present invention that uses A.I. in this manner has the camera (1) exchange information by wire or wirelessly with the AHD (101). Alternatively, the camera (1) for this step can be part of the Prompt Screen (109), speaker (111), or AHD itself (101) if the AHD (101) has line-of-sight access to the live camera subject(s).

An embodiment not shown in FIG. 2 is where the User (2) in the first step (201) selects from a "Favorites" list and jumps to the sixth step (206). An alternative embodiment after selecting from a "Favorites" list is to submit the Prompt through the Prompt Delivery System (108) at the same time as jumping to the sixth step (206).

2) Selecting the Type of Emotion or Reaction Live Subject(s) Should Exhibit (202): The second step (202) in the overall method (200) is where the User (2) selects the type of emotion or reaction the live camera subject(s) (3) should exhibit at the time of the shoot or filming. Further details on the type of emotions and/or reactions and how they are organized in the Application (102) are discussed later in Section IV the description of FIG. 4. The purpose of this step is to provide the second and final filter that the Application (102) uses to further refine the suitable Prompts to be presented to the User (2). As in the first step, the Prompts' metadata tags are used for this second filtering process. One selection method embodiment is where the User (2) engages widgets on the Application (102) GUI (e.g., windows and panels, menus, text fields, radiobuttons, checkboxes, buttons, etc.). An alternative method of selection embodiment is where the User (2) speaks within audible range of the system's microphone (103) with certain recognizable phrase(s) that indicate the type of emotion or reaction the live camera subject(s) (3) should exhibit. The subsequent process to recognize and confirm choices from the voice-based selection is similar to that outlined in the first step.

3) Application Presents Prompt(s) (203): The third step (203) in the overall method (200) is for the Application to retrieve and present to just the User (2) on the AHD's (101) screen one or plurality of Prompt(s), be they emotive phrase(s), and/or direction(s), and/or image(s), and/or sounds, and/or animations. An alternative embodiment allows the User (2) have the Prompt spoken out loud or played on a speaker or earphone connected to the AHD (101). Another alternative embodiment of this step can have multiple Prompt(s) presented so the User (2). Embodiments of the present invention can retrieve and present the Prompt(s) from a particular sequence of a pre-defined playlist or randomly off a database (i.e., a non-specific list of prompts) or user-defined playlist.

4) User Decision on Presented Prompt(s) (204, 205): The fourth step (204) in the overall method (200) is where the User (2) directs the Application to do one of three things. The first choice is to submit the Prompt through the PDS (108). If multiple Prompt(s) were presented in step (203), an additional sub-step to choose the Prompt is done before submitting the Prompt through the PDS (108). The second choice is to not submit the Prompt through the PDS (108) so the live camera subject(s) will not see and/or hear the Prompt(s). The third choice is to get a new Prompt or set of Prompt(s), which involves the Application (203) and process looping back to the third step (203). The User (2) can make the selection by interacting with the GUI or, in an alternative embodiment, by voice commands (e.g., "Hide," "Next," etc.).

At this step, the User (2) can have the Application (102) tag the current or one from the current set of Prompt(s) as a "Favorite" (205) to be placed in the "Favorites" bin of the repository. An alternative embodiment(s) of the overall method (200) allows the User (2) to "Favorite" (205) a Prompt(s) any of the subsequent steps of this method (200). The User (2) can make the "Favorite" the prompt by interacting with the GUI or, in an alternative embodiment, by voice commands (e.g., "Hide," "Next," etc.). Note, the option to "Favorite" (205) is never offered if the Prompt(s) are already a "Favorite" selected in the first step (201).

5) User Repeats the Prompt(s) (206): The sixth step (206) in the overall method (200) is where the User (2) repeats, if the Prompt(s) are phrase(s), direction(s), or provides supplemental guidance to the live camera subject(s) (3). By this time, if the User (2) chose the Prompt(s) to be projected, the live camera subject(s) (3) would have received it from the PDS (108).

6) User Captures Photo(s) or Video (207): The seventh and final step (207) in the overall method (200) is where the User (2) captures the live subject(s) executing genuine and authentic emotion(s)/gesture(s) on photographic or video camera (1). Just prior to capture, embodiments of the present invention allow the User (2) to capture a photo, video, slow motion, slow exposure, etc. Embodiments of the present invention can employ trained A.I. to shoot or remind the User (2) to shoot as soon as the ideal emotion among the live camera subject(s) is detected and maintained.

Figure 3:
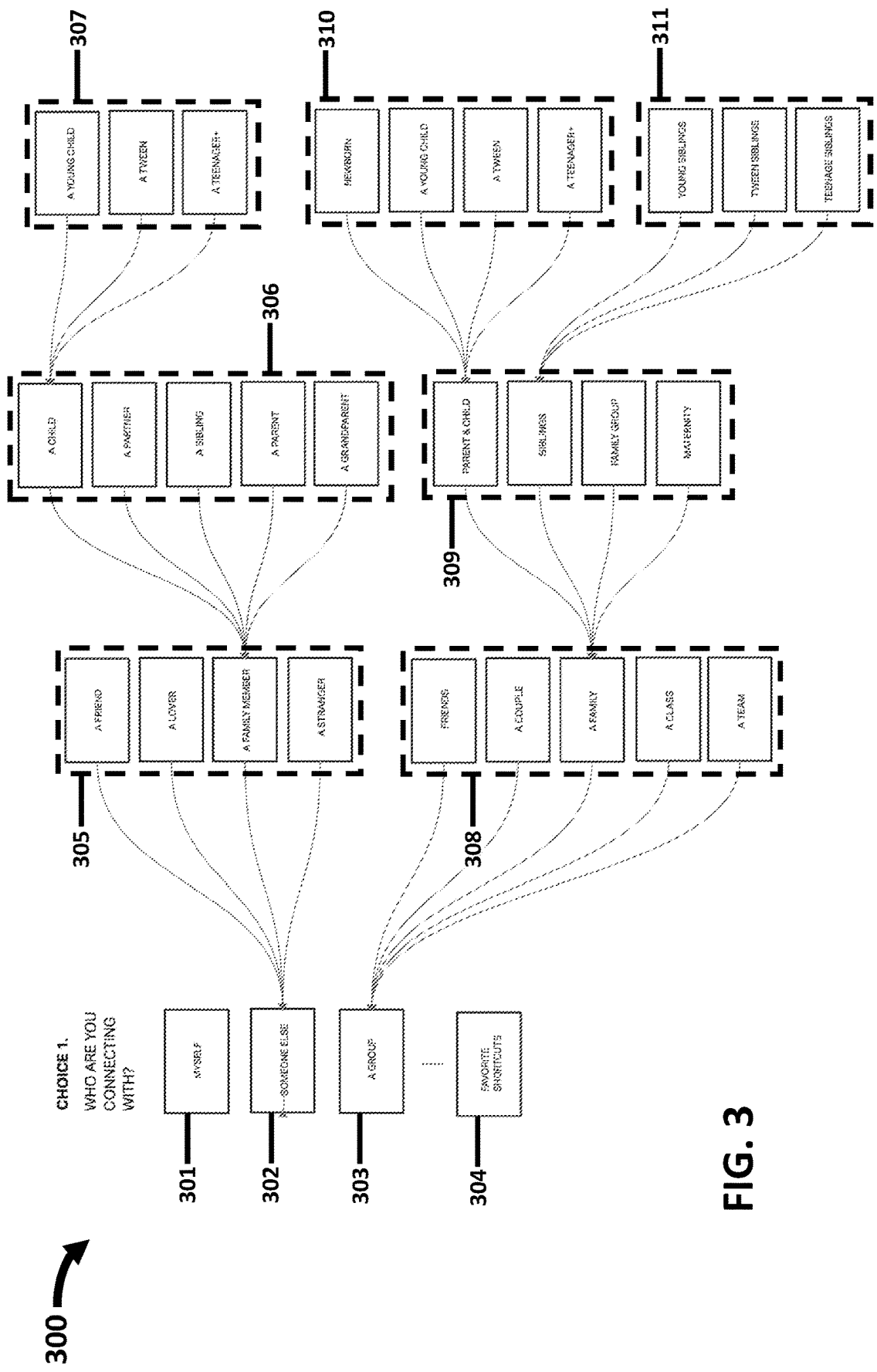
FIG. 3 is an embodiment of the organizational chart showing the type of live subjects and subtypes of the live subject(s) recognized within the Application and acts as a first stage filter to refine the presented Prompt set

III) Application Filter Based on Subject Type (300)—Ref. FIG. 3

FIG. 3 presents an embodiment of the organizational structure behind the type of live human subject(s) organized by category and plurality of more specific categories. This figure corresponds to the first step (201) shown in FIG. 2. For FIG. 3, the arrowheads seen on some lines do not indicate a process flow. The left-most column of elements (301-304) represents the top-level, broadest category as implemented in the Application Interface and shown to the User (2) first when the Application (102) starts the process outlined in SECTION II. The three main human live camera subject(s) elements (301-303) are "Myself," "Someone Else," and "A Group."

The Favorites Shortcut (304) when engaged on the Application Interface or by voice command, opens up an organized list of previously chosen Prompt(s) that have some indication of Favorites in the list of metadata tags. If the User (2) chooses a Prompt(s) from this Favorites list, the process will skip over to the sixth step (206) as shown in FIG. 2 and discussed at the end of SECTION II1.

In the column of elements (305, 308) one level below the top level is more specific categories of live camera subject(s) types. These are on a subsequent and separate page on the Application Interface for the User (2) after either the "Someone Else" (302) or "A Group" (303) was chosen.

If "Someone Else" (302) was selected, a new GUI page appears on the Application Interface listing additional choices shown in element set (305) to further refine the list of potential Prompt(s); these choices comprise "A Friend," "A Lover," "A Family Member," and "A Stranger." Further, if "A Family Member" is chosen, then another GUI page appears on the Application Interface listing additional choices shown in element set (306) to further refine the list of potential Prompt(s); these choices comprise "A Child," "A Partner," "A Sibling," "A Parent," and "A Grandparent." If "A Family Member" is chosen, then another GUI page appears on the Application Interface listing additional choices shown in element set (306) to further refine the list of potential Prompt(s); these choices comprise "A Child," "A Partner," "A Sibling," "A Parent," and "A Grandparent." Further, if "A Child" is chosen, then another GUI page appears on the Application Interface listing additional choices shown in element set (307) to further refine the list of potential Prompt(s); these choices comprise "A Young Child," "A Tween," and "A Teenager+" (teenager or young adult).

If "A Group" (303) was selected, a new GUI page appears on the Application Interface listing additional choices shown in element set (308) to further refine the list of potential Prompt(s); these choices comprise "Friends," "A Lover," "A Couple," "A Family," "A Class," and "A Team." Further, if "A Family" is chosen from element set (308), then another GUI page appears on the Application Interface listing additional choices shown in element set (309) to further refine the list of potential Prompt(s); these choices comprise "Parent & Child," "Siblings," "Family Group," and "Maternity." Further, if "Parent & Child" from element set (309) is chosen, then another GUI page appears on the Application Interface listing additional choices characterizing what type of child is shown in element set (310) to further refine the list of potential Prompt(s); these choices comprise "Newborn," "A Young Child," "A Tween," and "A Teenager+" (teenager or young adult). If instead "Siblings" is chosen from element set (309), then another GUI page appears on the Application Interface listing additional choices shown in element set (311) to further refine the list of potential Prompt(s); these choices comprise "Young Siblings," "Tween Siblings," and "Teenage Siblings."

An embodiment of the Application (102) allows the User (2) to create new elements that are not shown in FIG. 3, edit, or delete elements. Another embodiment of the Application (102) allows the User (2) to create more detailed subtypes that branch off existing elements.

An embodiment of the Application (102) is a variation of the organizational structure shown in FIG. 3 representing live, non-human subject(s), especially domesticated animal pets. Though no embodiment is shown in this disclosure, it is understood that the present invention can be expanded to include live, non-human subject(s) using the same basic method and provisions disclosed. For example, while most animals may not be able to speak phrases, they can respond to direction(s), image(s), sound(s), and animation(s), and the genuine and authentic responses may be more easily realized with the disclosed system and methods.

IV) Application Filter Based on Emotion (400)—Ref. FIG. 4

FIG. 4 presents an embodiment of the organizational structure behind the type of feelings or emotions or reactions (400) that should be evoked at the time of camera (1) shooting. This figure corresponds to the second step (202) shown in FIG. 2 and illustrates the second (400) of a two-stage filter to refine the choices of Prompt(s) that will be presented individually or as a group to the User (2).

The list (400) of emotions shown comprises a broad bin "LOL" or laughing out loud (401) that includes feelings of light-heartedness, joy, etc. "Warm & Fuzzy" (402) includes feelings of affection, connection, care, etc. "Deep & Meaningful" (403) includes feelings of intimacy, introspection, etc. and what is shown is dependent on the choices made in step (201) and presented in FIG. 3. Hence this second stage filter is context-dependent. For example, if "A Team" in set (308) of FIG. 3 was chosen in step (201), the second stage filter list on the Application Interface may not present "Warm & Fuzzy" (402) and may instead present a second stage filter associated with "Encouraging" or whatever the Application (102) determines to be more appropriate to the subject chosen.

The three categories (401-403) shown are just examples of a simplified format of selecting ranges of emotions and are not conclusive of the emotions that can be generated with the Application (102). In fact, the system and methods make it possible to evoke any emotion humans are capable of experiencing, even though feelings such as:

euphoria, inspiration, amusement, enjoyment, awe, open, happy, alive, good, understanding, great, playful, calm, proud, confident, courageous, peaceful, joyous, energetic, at ease, easy, lucky, liberated, comfortable, amazed, fortunate, optimistic, pleased, free, delighted, provocative, sexy, encouraged, sympathetic, overjoyed, impulsive, clever, interested, gleeful, surprised, satisfied, thankful, frisky, content, receptive, important, animated, quiet, accepting, festive, spirited, kind, ecstatic, thrilled, relaxed, wonderful, serene, glad, free and easy, cheerful, bright, sunny, blessed, merry, reassured, aroused, elated, jubilant, interested, positive, strong, loving, eager, considerate, affected, keen, affectionate, fascinated, earnest, sure, sensitive, intrigued, intent, certain, tender, rebellious, devoted, inquisitive, attracted, determined, dynamic, passionate, excited, tenacious, admiration, engrossed, enthusiastic, warm, curious, bold, secure, touched, brave, sympathy, daring, close, loved, optimistic, comforted, re-enforced, hopeful, glorious . . .
are in general the kinds of feelings a person would usually want to convey in a photograph and the ones that the preferred embodiment of the Application (102) for human camera subjects primarily focuses on. With future updates and particularly with the ability Users (2) have to create their own prompts, it is possible an even wider range than listed would be made available.

The list (400) can be expanded or edited by the User (2) by interacting with the widgets of the Application Interface. Embodiments of the Application (102) can include voice control of the selection and editing of this list (400).

Figure 5:
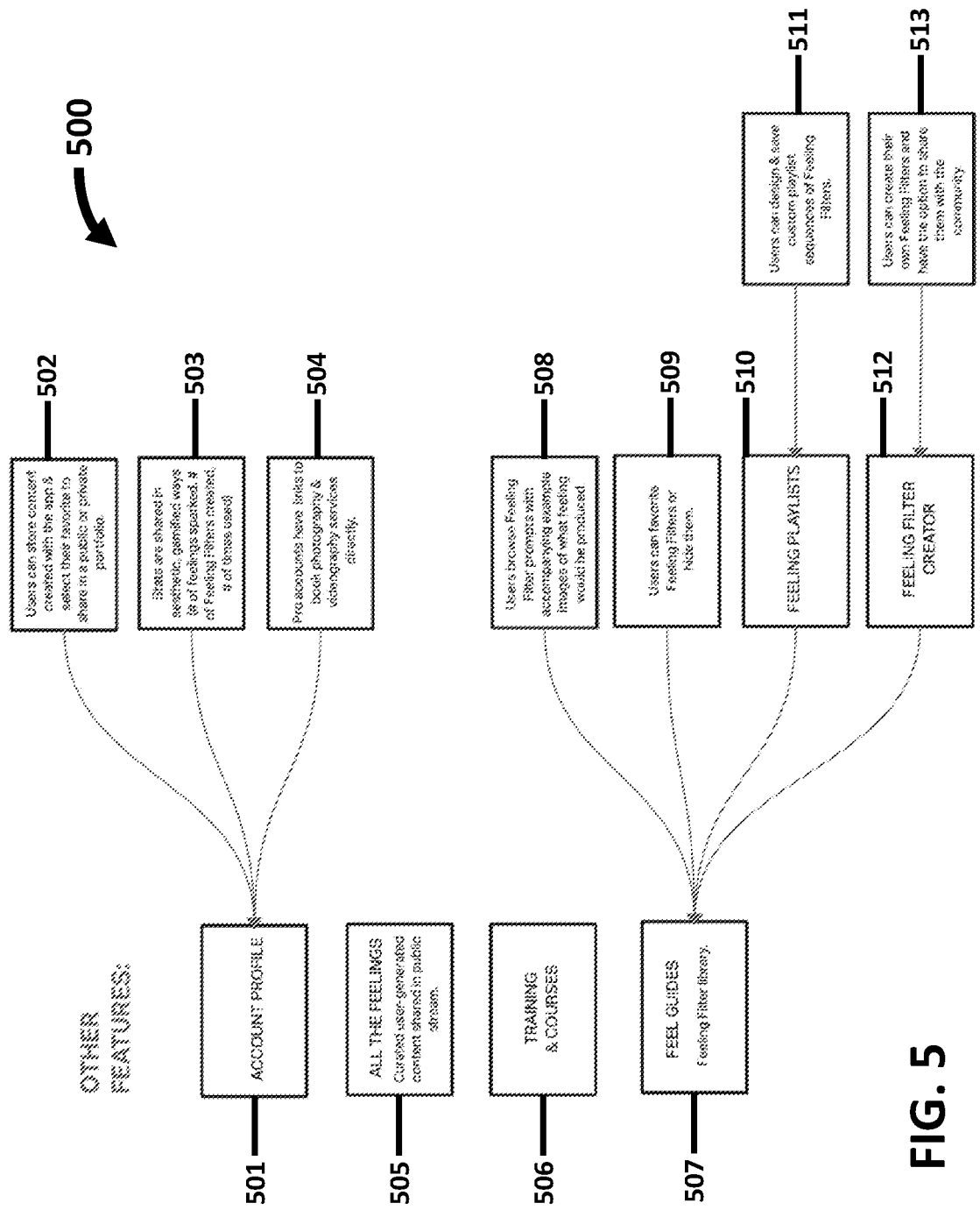
FIG. 5 shows an embodiment of the other features within the Application

V) Other Application Features (500)—Ref. FIG. 5

FIG. 5 presents an embodiment of other features in the Application (102). As with FIG. 3, there is an organizational hierarchy for each category and sub-category of features. For FIG. 5, the arrowheads seen on some lines do not indicate a process flow. The top-level main categories of features are "Account Profile" (501) which is a creatable and editable digital database record of a User's (2) or customer's identifying information comprising fields such as name, address, telephone number, fax number, email, account privileges, "All the Feelings" (505) which represent captured photos or video, "Training & Courses" (506) for guide usage of the Application (102) and related tips to get the best possible emotion(s) or reaction(s) from live camera subject(s) (3), and Feel Guides (507) which is also known as Prompt(s) in the present disclosure. When the User (2) interacts with the widget(s) of any one of the main categories (501, 505, 506, 507), the Application Interface then shows a specific page for the given category and available action features.

For example, under Account Profile (501), there is an account store/share provision (502) for the account holder to store the content such as photo(s) and/or video(s) created and digitally share in a private or public portfolio, which in the preferred embodiment, would be a website. Each account holder can also have data analytics associated with Prompt(s) (503) such as the number of times used, success rate, etc. Embodiments of the Application Interface can present these analytics in an aesthetic, video game graphics-like environment. Embodiments of the Application Interface (102) under Account Profiles (501) with eligible membership (e.g., "Pro" account) can have access (504) to photographic and/or videography services directly.

Under "Feel Guides" (507), embodiments of the present invention may browse Prompt(s) with multimedia example(s) (508) visually depicting a successful response from live camera subject(s). As mentioned earlier, users can tag Prompt(s) as their Favorites or not submit them through the PDS (108). Unlike other sub-category elements in FIG. 5 that are accessed under a broader category, this feature is presented during the process outlined in steps 204 and 205 of FIG. 2 and in other embodiments in either step(s) (206) and/or (207). Another sub-category is "Feeling Playlists" (510) which comprise a sequence of favorite Prompt(s) under one group which represent a certain emotion(s) or reaction(s) to be evoked. A User (2) can also create his/her own Prompt(s) playlist (511). An embodiment of the present invention has provisions for the User (2) to create his/her own Prompt(s) (512). Embodiments of the present invention can expand on this with the feature for the User (2) his/her Prompt(s) with the community (513) by methods comprising posting on a bulletin board, social media group, etc. As mentioned in Section II3, an embodiment of the present invention (not shown) is a random selector to the Prompt(s) from a particular sequence of a pre-defined playlist or randomly off a database or user-defined playlist; choosing this route in the Application (102) also bypasses the filtering steps and follows a similar process as choosing to favorite Prompt(s). An alternative embodiment of the present invention where a favorite, or user-defined playlist, or randomly selected Prompt(s) are retrieved, the Application can allow the User (2) to preview the Prompt(s) before having the current Prompt(s) sent through the PDS (108).

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

What is claimed is:

1. A system for a user taking photographs or videos with a camera to help evoke genuine and authentic emotions of one or a plurality of live camera subjects before the photo or video is captured, comprising:
   a digital device with a processor, a display, and system memory;
   a software application with a graphical user interface installed on the digital device or a remote server;
   wherein said application is used to store, manage, access, and view metadata tagged prompts;
   a pre-loaded library of metadata tagged prompts;
   wherein said prompts being emotive phrase(s), direction(s), image(s), sound(s), and/or animation(s) to help evoke genuine and authentic emotions of one or a plurality of live camera subjects;
   wherein said application has a two-stage filter to successively refine the list of said prompts to be presented to the user;
   wherein a first stage filter comprises an organized list of a plurality of live camera subject types;
   wherein a second stage filter comprises an organized list of emotions to be evoked;
   wherein a set of selectable top-level options shown in the graphical user interface for the first stage filter comprises the system user or self, someone else, and a group type of live camera subjects;
   and a prompt delivery system to convey prompts to one or a plurality of live camera subjects.

2. The system of claim 1, further comprising the digital device with at least one microphone and a speech-to-text signal processor for receiving and converting user voice commands to instructions for the application to execute.

3. The system of claim 1, further comprising:
   at least one speaker or earphone connected to the digital device so the application can convey information and/or prompts to the user;
   wherein said application has a text-to-speech processor for speaking verbal information and/or prompts.

4. The system of claim 1, further comprising a second display for conveying visual prompts to one or a plurality of live camera subjects received from said application.

5. The system of claim 1, further comprising:
a speaker within the prompt delivery system so the application can convey audible prompts to one or a plurality of live camera subjects;
wherein said application has a text-to-speech processor for speaking verbal information and/or prompts.

6. The system of claim 1, further comprising:
a speaker and a second display within the prompt delivery system so the application can convey video and audible prompts to one or a plurality of live camera subjects;
wherein said application has a text-to-speech processor for speaking verbal information and/or prompts.

7. The system of claim 1, further comprising:
a provision in the application's graphical user interface for tagging and organizing prompts as user-defined favorites.

8. The system of claim 1, further comprising:
a trained artificial intelligence module to recognize one or a plurality of live camera subject types;
and a module that selects the live camera subject type on the application for the system user.

9. The system of claim 1, further comprising:
an application module for creating and playing user-defined playlists of prompts;
and a playback module within the application to randomly retrieve prompts from a user-defined playlist or off a non-specific list of prompts.

10. A method for evoking and capturing genuine and authentic emotions of one or a plurality of live camera subjects using the system of claim 1, comprising:
(a) selecting from said software application installed on said digital device with said processor, said system memory, and said display, a type of one or a plurality of live camera subjects which the application uses to screen through said library of metadata tagged prompts to find the list of suitable prompts;
(b) selecting from the application, 2 type of emotion for the one or a plurality of live camera subjects should exhibit which the application uses to screen through said library of metadata tagged prompts to further refine the list of suitable prompts;
(c) previewing one or a plurality of prompts selected from said library of stored and metadata tagged prompts accessed by the application and presented by the application on at least the digital device's display;
(d) selecting from said application whether to convey the one or plurality of prompts to one or a plurality of live camera subjects by way of said prompt delivery system, selecting from said application to not convey the one or plurality of prompts, or selecting from said application to retrieve one or a plurality of new prompts;
(e) repeating step (c) if the result of previous step was the selection to retrieve one or a plurality of new prompts;
(f) repeating the one or plurality of prompts to one or a plurality of live camera subjects while preparing to capture a photograph or video of one or a plurality of the live camera subjects on said camera;
(g) capturing a photograph or video of one or a plurality of the live camera subjects on the camera.

11. The method of claim 10, wherein presentation of the one or a plurality of prompts to be previewed is by audible format sent from said application to at least one speaker or earphone connected to the digital device, wherein said application has a text-to-speech processor for speaking verbal information and/or prompts.

12. The method of claim 10, further comprising the tagging of the current prompt as a favorite.

13. The method of claim 10, further comprising:
one or more selections on the application being made after uttering voice commands within audible range of the digital device;
wherein said digital device is connected to at least one microphone for receiving voice commands;
said application having a speech-to-text processor for mapping voice commands to instructions for the application.

14. The method of claim 10, wherein the selection of the one or plurality of live camera subject types on the application is by capturing the image of the one or plurality of live camera subjects and classifying the one or plurality of live camera subjects with a trained artificial intelligence database and algorithm.

15. The method of claim 10, further comprising:
the application continuously monitoring the live feed of the one or plurality of live camera subjects;
determining through a trained artificial intelligence database and algorithm whether the appropriate genuine and authentic emotions are evoked; and
capturing a photograph or video of one or a plurality of the live camera subjects on the camera.

16. A method for evoking and capturing genuine and authentic emotions of one or a plurality of live camera subjects using the system of claim 1, comprising:
(a) selecting from said software application installed on said digital device with said processor, said system memory, and said display, a prompt or plurality of prompts previously tagged as a favorite and indicated within a favorites repository or a playlist of favorite prompts on the software application;
(b) selecting from said software application whether to convey the one or plurality of prompts to one or a plurality of live camera subjects by way of said prompt delivery system or selecting from said software application to not convey the one or plurality of prompts;
(c) repeating the one or plurality of prompts to one or a plurality of live camera subjects while preparing to capture a photograph or video of one or a plurality of the live camera subjects on said camera;
(d) capturing a photograph or video of one or a plurality of the live camera subjects on the camera.

17. The method of claim 16, further comprising:
the application continuously monitoring the live feed of the one or plurality of live camera subjects;
determining through a trained artificial intelligence database and algorithm whether the appropriate genuine and authentic emotions are evoked;
and capturing a photograph or video of one or a plurality of the live camera subjects on the camera.

18. The method of claim 16, where instead of choosing a prompt or plurality of prompts previously tagged as a favorite and indicated within a favorites repository or a playlist of favorite prompts, the applicant randomly selects from a user-defined playlist or non-specific list of prompts.

* * * * *